Dec. 22, 1936.  E. REINHOLD ET AL  2,064,987
PHOTOMETER
Filed Oct. 28, 1935  2 Sheets-Sheet 1
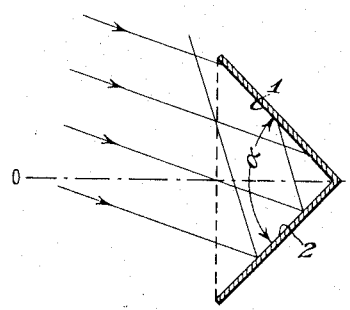
*Fig. 1*
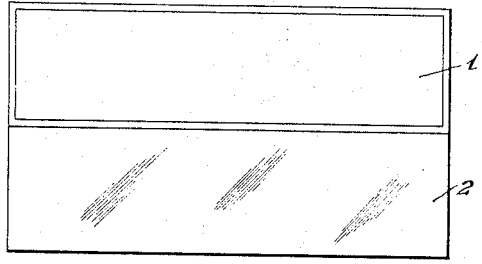
*Fig. 2*
*Fig. 3*
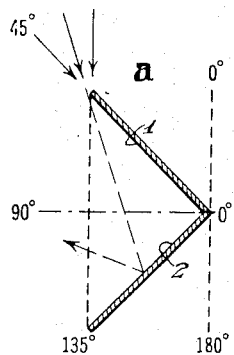 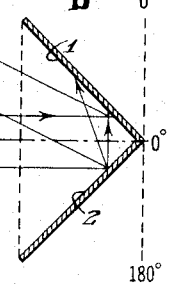 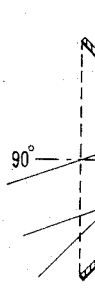 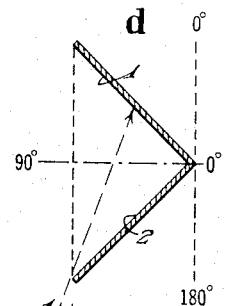
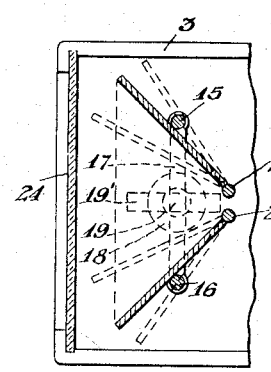
*Fig. 8*
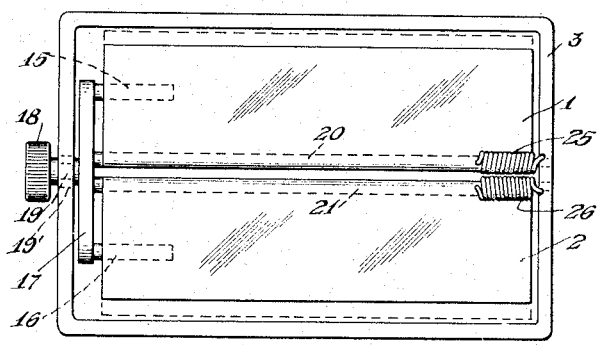
*Fig. 9*
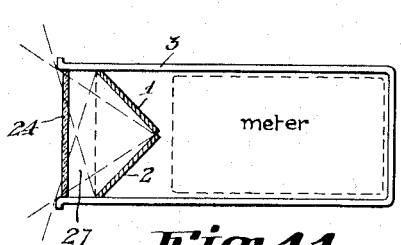
*Fig. 11*
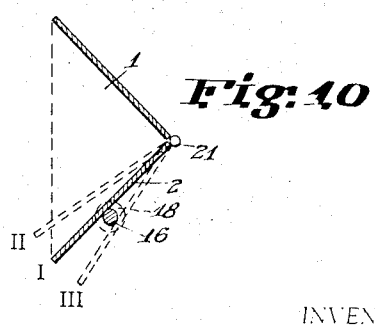
*Fig. 10*
INVENTOR.
Ernst Reinhold
Joseph M. Bing
BY
ATTORNEY.

Dec. 22, 1936.  E. REINHOLD ET AL  2,064,987

PHOTOMETER

Filed Oct. 28, 1935  2 Sheets-Sheet 2

INVENTOR.
Ernst Reinhold
Joseph M. Bing
BY
Karl Nam
ATTORNEY.

Patented Dec. 22, 1936

2,064,987

UNITED STATES PATENT OFFICE 2,064,987

PHOTOMETER

Ernst Reinhold, Leipzig, Germany, and Joseph M. Bing, New York, N. Y., assignors to Photo Marketing Corporation, New York, N. Y., a corporation of New York Application October 28, 1935, Serial No. 47,024
In Germany December 22, 1934

14 Claims. (Cl. 88—23)

The present invention relates to electric photometers, more particularly to a photographic exposure meter serving as an accessory for photographic apparatus for determining the proper degree of exposure, such as the correlated shutter speed and lens diaphragm or "stop" values dependent on the strength of the light passing from an object or scene to be photographed through the lens to the sensitive plate or film in a camera.

In spite of the recent advances made in sensitive material and the fact that the modern plates and films have a very wide margin of latitude in exposure as compared to material of a few years ago, the secret of successful photography still lies in a correct exposure of the negative. This is especially true with regard to negatives made with modern miniature cameras which are usually enlarged to many times the size of the original negative whereby, as is well known, the necessity for correct exposure is very important if the enlargement is to bear the same tonal quality and gradation as that of the original object.

The invention is concerned more specifically with exposure meters of the type employing a photoelectric device of the self-generating or photo-voltaic type having for its basic construction a form of light sensitive element with a flat surface responsive to light and capable of producing an electric current when struck by light rays. This current gets stronger as the light gets brighter. For reading purposes, the current generated by the photoelectric element is transmitted to a small measuring instrument, such as a micro-ammeter provided with a pointer and electrically connected to the photoelectric element. The photoelectric element and measuring instrument are suitably mounted in a common casing as described, for instance, and disclosed by German Patent 312,805 issued June 12, 1919, to make a compact and portable device which can be easily and conveniently carried by the photographer or mounted to or structurally built in the camera itself. The measuring instrument indicates to the photographer the intensity of the light passing from the subject or scene to be photographed when the device is held with its light sensitive surface pointing in the direction of the subject or scene to be reproduced upon the sensitive plate or film in the camera. This type of meter is entirely self-contained and does not require any outside electrical stimulation such as an electric battery for its operation.

A well known construction of a self-generating or voltaic type of photoelectric element capable of producing an electric current when struck by light rays independently of an additional electrical stimulation and suited for the purpose of this invention comprises a first or base electrode in the form of a flat metal disc or plate having applied thereon a thin layer of a semi-conducting light sensitive material such as selenium in crystalline form or cuprous oxide when using a base consisting of copper. The layer of light sensitive material which is intimately united to the base electrode in molecular contact therewith is in turn covered with a translucent metallic covering layer forming the second electrode of the unit. If light rays passing through the translucent covering layer are impinged upon the light sensitive layer, electrons are set free from the light sensitive layer and passed through the boundary space of molecular thickness between the layers, thus causing an electric potential difference between the electrodes. As a result, an electric current will be set up in an electrical circuit connected to the photoelectric element. This current is indicated or measured by a suitable measuring instrument such as a micro-ammeter as described and is proportional to the intensity of the light rays striking the sensitive surface of the photoelectric element.

Photographic exposure meters of the above and similar type known in the art employing a light sensitive electric element as distinguished from exposure meters operating on a different principle such as meters of the optical or extinction type have the advantage that the measurement or evaluation of the light intensity is absolute and independent of the personal element on the part of the photographer.

The exposure in photographic cameras as is well known necessarily depends on several factors; the speed or sensitivity of the plate or film, the correlated lens aperture or "stop" values, and the shutter speed to be used, the nature of the subject and the scene brightness or strength of the light passing from the subject to be photographed to the photographic plate or film through the lens of the camera. It is with regard to the last two that the exposure meter demonstrates its value in practical photography.

Referring to exposure meters of the specific type above described, employing a photoelectric element of the self-generating type having a flat light sensitive surface, it has been found necessary to provide a light baffle in order to assure that only such light strikes the sensitive surface as passes from the object or scene to be photographed through the lens of the camera to the film or plate, that is, light only as falls within a fixed angle corresponding to the field angle of the camera which is normally about 50°. Light rays of greater angular spread, that is, rays reflected from objects outside the range of the view angle of the camera should be prevented from reaching the sensitive surface of the exposure meter, otherwise false indications would be obtained through the use of such rays originating from objects not contained in the scene to be reproduced on the negative film or plate in the camera. This is especially true in the case of objects of great light contrast outside the range of the view angle of the camera such as a bright sky or clouds and the like which are likely to interfere with the correct evaluation of the scene brightness and to cause an entirely wrong exposure and consequent spoiling, irreparable loss of pictures and waste of negative material.

Accordingly, it is an object of the present invention to provide a novel and efficient means for limiting the effective view angle or the angular limits of the light rays affecting the light sensitive surface of an exposure meter of the type described, or in other words, to secure an effective directional characteristic of the light rays affecting the light sensitive surface of predetermined effective angular spread and corresponding substantially to the view angle of a photographic camera.

In modern photographic equipment, especially for the higher priced cameras such as miniature cameras of the universal type, it is customary to provide a plurality of exchangeable lenses of different focal lengths resulting in different camera view angles to suit special picture taking requirements. Thus, for instance, modern cameras of this type are usually supplied with a telephoto lens for taking distant views or for portrait photography to improve the natural perspective of the subject. In this case the view angle of the camera is decreased below the normal angle (about 50°) to values as low as about 25°. In addition, it is customary to provide a so-called wide angle lens for taking photographs of architectural and interior scenes resulting in an increased view angle beyond the normal to values as high as 90°.

When using an exposure meter with a fixed view angle corresponding to the normal view angle of a photographic camera, that is, about 50°, in connection with a camera of a greater or smaller field angle, such as when taking telephoto or wide angle views as described, it is understood that wrong exposure indications will be obtained resulting in over- or under-exposed negatives. Thus, for instance, when taking telephoto views and determining the exposure by means of a meter of normal view angle (50°), objects outside the angular range enclosed by the camera lens and not enclosed in the scene to be photographed; that is, objects falling within the range between about 25° and 50° angular spread will affect the light sensitive surface of the meter, resulting in a more or less wrong evaluation of the average scene brightness depending upon the degree of contrast between objects outside and within the camera view angle. On the other hand, when taking wide angle views and using an exposure meter of normal view angle, objects falling outside the view angle of the meter; that is, within the range between about 50° and 90° will take no part in the evaluation of the scene brightness although they form a part of the scene to be photographed. This also will result in wrong indications and in wrong exposures in a manner similar as in the case of telephoto photography discussed before.

The above disadvantages may be obviated to some extent by carrying out the measurement at the proper distance from the object or scene to be photographed in such a manner that the latter is embraced by the base of a cone of rays enclosed by the opening or view angle of the meter, whereby objects not falling within the view angle of the camera are excluded from affecting the light sensitive element of the meter. This would make it necessary for the photographer to change his position in each case, a procedure, which besides constituting a great inconvenience, is practically impossible in numerous cases where the position of the photographer is fixed such as when photographing from vantage points such as high buildings, mountains, etc.

Accordingly, it is a further object of the invention to provide an exposure meter construction of the type described which permits of an easy variation of the view angle in such a manner as to suit any special picture taking requirements such as for normal use, and telephoto or wide angle photography.

While exposure meters, especially those of the electric type mentioned above, are adapted for measuring the absolute scene brightness or light values of the scene or objects to be photographed independently of the personal factor on the part of the photographer, it is not possible to produce an exposure meter which cannot be wrongly used and eliminates the personal factor as regards the nature or character and pictorial value of the subject or scene to be photographed. Subjects vary according to their degree of contrast, or in other words, the range between lights and shadows. Thus, for instance, in the case of an open landscape, there may be a special object or group of objects in the foreground of substantially darker tonal values than the sky and the background. Accordingly, this object will in theory require two exposures, such as for instance, 1/25 of a second for the open landscape while 1/5 of a second may be required to secure sufficient detail for shadows for objects in the foreground which may be a group of trees or persons and the like. These will be indicated by an exposure meter by taking readings of the two parts of the object. Here the personal factor enters. The exposure meter calculates the exposure for the shadow details and while this is excessive for the higher lights these will be retained by the latitude of the negative material.

From this it follows that exposure meters, while they can measure the light intensity correctly, have to be used judiciously and in many cases such as described above merely mechanical pointing and reading of the meter, whatever type, is not rendering the most satisfactory results. As pointed out, every meter has a specific view angle which on the average is about 50° corresponding to the lens of normal camera equipment.

From whatever position the meter is read it will give the average exposure; that is, the mean or integrated value of the various light values of the different parts of the subject. The meter is at the apex of a cone, the sides of which form an angle of about 50° in the normal meter construction, as explained. If a distant landscape is measured from an elevation with exclusion of the sky, then the meter will indicate the average exposure which is also the necessary exposure for a scene of this nature.

If, however, just a specific object in the foreground such as a picturesque arrangement of trees, or a group of persons, etc., constitutes main value of a picture, it will be necessary as pointed out above, in order to secure a correct reading resulting in a correct exposure meter, that the meter angle of view just embraces the main object or objects only at the base of the cone formed by its view angle since only one exposure can be given and no differentiation is possible on the film and the exposure must be such that it does absolute justice to the object or objects of main interest while the background will be pictured quite satisfactorily on account of the margin of latitude of the film.

In order to fulfill this requirement, the object of main interest may be approached at varying distances in a manner similar as explained above in connection with the telephoto and wide angle photography.

This latter procedure has the same disadvantages as pointed out above and accordingly it is a further object of the invention to provide an exposure meter construction which enables the photographer to vary the angle of view of the meter either gradually or in predetermined steps in such a manner that the base of its cone enclosed by its view angle embraces a desired object or group of objects within the main viewing field of a camera.

A further object of the invention is to provide an exposure meter construction which permits of a direct reading of the exposure required for taking photographic pictures without any numerical readings and calculations to be performed by the photographer.

The invention has other objects in view which will appear hereafter in the detailed description thereof in connection with the accompanying drawings in which we have shown an exposure meter construction embodying the invention.

Figs. 1 and 2 illustrate diagrammatically a combination of a photoelectric element and a reflector for the purpose of the invention.

Figs. 3a–3d represent diagrammatic views explanatory of the directional effect of the incident light rays upon the light sensitive element.

Figs. 8 and 9 illustrate front and side elevational views, respectively, of an exposure meter construction with means for varying the view angle.

Fig. 10 is a diagram illustrating a modification of a meter construction shown by Figs. 8 and 9.

Fig. 11 shows diagrammatically a further modification of and arrangement according to the invention for varying the view angle of the exposure meter.

Similar reference characters identify similar parts throughout the different views of the drawings.

Figure 6:
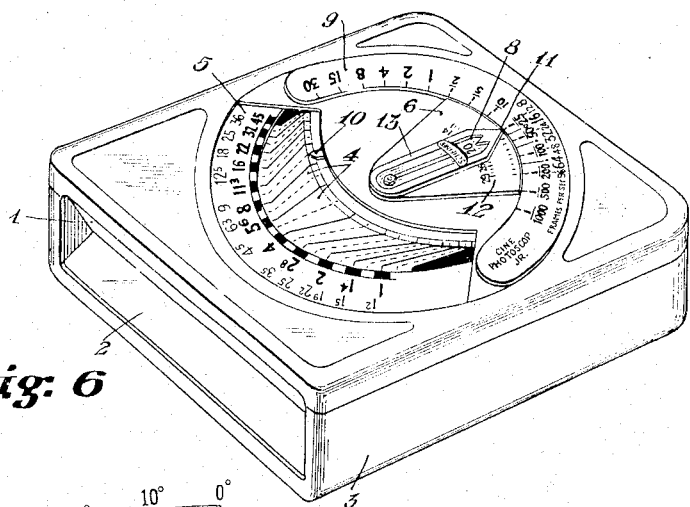
Figs. 6 and 7 show perspective and top views, respectively, of a complete exposure meter construction embodying the invention.

With the above objects in view, the invention in general relates to an exposure meter construction comprising a photoelectric element having a flat light sensitive surface and a light reflecting means such as a mirror, which may be flat, curved, (or parabolic mirror), a prism or the like suitably associated with the photoelectric element or wherein the photoelectric element is itself suitably designed by mounting in an inclined position or by having a curved sensitive surface, so that incoming light rays strike the sensitive surface under varying incident angles in such a manner that the light reaches the light sensitive surface either directly or indirectly through reflection.

In this manner it is possible to secure an effective directional characteristic of a predetermined angular spread with regard to light rays affecting the light sensitive surface. This angle may be either fixed for use with normal camera equipment, or means may be provided for varying the relative position of the photoelectric element and the reflecting element to secure a directional characteristic of varying angular spread to suit special picture taking requirements such as for telephoto or wide angle photography or for securing pictorial effects by taking into account the nature or character of the subject or scene to be photographed.

Referring to Figs. 1 and 2, we have shown diagrammatically an embodiment of an arrangement according to the invention comprising a flat light sensitive element shown at 1, in the example shown of rectangular shape, which may be of the type as described hereinbefore, and a mirror 2 such as a metallic mirror of similar size as the light sensitive element 1 and enclosing a definite angle $a$ therewith. In the example shown, this angle is about 90° with its bisecting line 0—0 in the horizontal direction. The surface of the mirror 2 and the light sensitive surface of the element 1 are facing each other in such a manner that an effective directional characteristic of predetermined angular spread is obtained for light rays affecting the photoelectric surface 1 as will appear in greater detail from the explanatory diagrams according to Figs. 3 and 4. In the latter, the intersection point 0 forms the origin of a polar coordinate system with the vertical vector corresponding to zero degrees, the horizontal vector corresponding to 90° and the vector pointing in a downward direction corresponding to 180° as shown.

In an arrangement of this type, light rays falling within the range comprised by zero and 45° do not reach the photoelectric surface, but only strike the mirror 2 and are reflected in an outward direction without reaching the photoelectric surface as seen from Fig. 3a. Within the range from 45° to 90° the photoelectric surface receives light both directly in accordance with the well known sinusodial law (photoelectric effect proportional to the sine of the angle formed by the direction of incidence of the light rays with the photoelectric surface) and indirectly through reflection from the mirror 2. The more the direction of the incident light rays approaches the 90° vector, the more reflected light from the mirror reaches the photoelectric surface. This is more clearly illustrated by the diagram according to Fig. 3b. If the angle of the incoming light rays becomes greater than 90°, the entire light impinged upon the mirror 2 is reflected to the photoelectric surface in such a manner that within the range of 90° to 180° the effective distribution of the light rays follows the sinusoidal law taken with regard to an imaginary sensitive surface coinciding with the front limiting surface of the mirror and the photoelectric element as shown in dotted lines at 1' in the diagram. Thus, by a mirror light baffle of the type described, the following effect is obtained: the light sensitive surface is unaffected within the angular range from zero to 45°. The response then gradually increases from zero to maximum at 90°. With a further angular increase the response again gradually decreases in a normal manner taken with regard to an imaginary sensitive surface shown at 1'.

Figure 4:
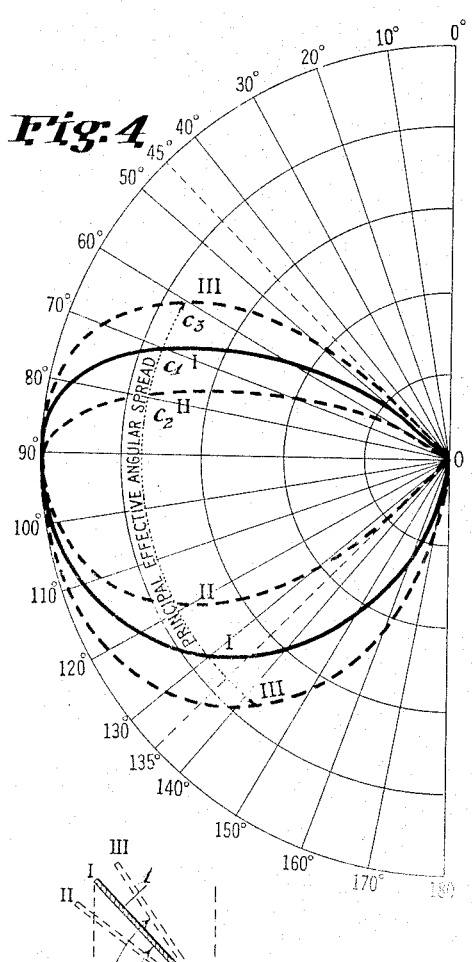
Fig 4 shows a directional polar characteristic for arrangements as illustrated in Figs. 1 to 3.

We have shown at Fig. 4 a directional polar characteristic illustrating the photoelectric response for the different directions. In this diagram the length of the vector from the origin 0 to the intersection point with the polar curve $c_1$ represents in a known manner the photoelectric response of light rays arriving in a corresponding direction. By varying the angle $\alpha$ and by a proper design and relative arrangement of the mirror and the photoelectric element, it is possible to modify the light response characteristic within certain limits so as to obtain, for instance, an unsymmetrical characteristic desirable for certain specific purposes or to suit any other picture taking requirements.

Figure 5:
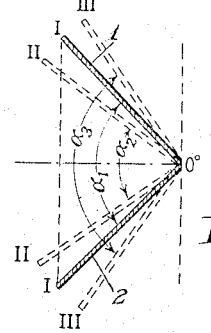
Fig. 5 shows another diagram of an arrangement of the type shown by the preceding figures for securing a variable meter view angle.

Thus, we have shown two further polar characteristics $c_2$ and $c_3$ of lesser and greater effective angular spread obtained by varying the enclosing angle between the photoelectric element 1 and reflector 2 such as indicated diagrammatically in Fig. 5. The latter shows two further angular positions (II and III corresponding to a smaller and larger angle $\alpha 2$ and $\alpha 3$, respectively), in addition to the normal position (I angle $\alpha 1$), resulting in the modified polar curves $c_2$ and $c_3$ as shown in Fig. 4. The dimensions and form of the curves shown are not drawn exactly to scale but are approximate only and illustrate the general principle of the invention. Thus, the position I of the photoelectric element and camera may correspond to normal condition (50° view angle) while the positions II and III will be suited for telephoto and wide angle photography. A practical construction for varying the view angle or relative position of the elements 1 and 2 will be described later.

The diagram shown in Fig. 4 relates to angles in elevation as described. For horizontal angles, the photoelectric response gradually decreases similarly on both sides from the maximum according to a curve similar to the upper portion of the diagram for elevation angles as shown.
This decrease is caused by the sine law function on the one end and is furthermore due to the fact that the smaller the angle of incidence of light rays striking the reflector the more the light will be reflected out and away from the sensitive surface of the photoelectric element.

In arrangements of the above nature as is understood, a certain screening effect occurs at the side of the photoelectric cell while the entire available light flux is utilized through the reflecting action of the mirror at the side of the mirror. A directional characteristic as obtained with a photoelectric cell and reflector combination as described enclosing an angle of 90° is especially suited for all-around photographic purposes; that is, for a camera view angle of about 50°. As is seen from the characteristic as shown in Fig. 4, it is not necessary to tilt the meter in order to gain more of the foreground in the case of landscape photography as is advisable and necessary when using meters of other types known in the art. This is due to the unsymmetrical shape of the characteristic and is of special importance in the case of photographing landscapes with important pictorial foreground, so that there is the assurance that every detail will be reproduced on the plate or film while the sky may be overexposed and is retained by the margin of latitude of the negative material or held back by the use of filters in a well known manner. In order to obtain a more even directional characteristic with definitely determined limiting angles, it is furthermore advisable in the practice of the invention to provide a chamber or channel in front of the photoelectric cell and light deflecting element, as described in more detail hereafter in connection with Fig. 11.

Figure 7:
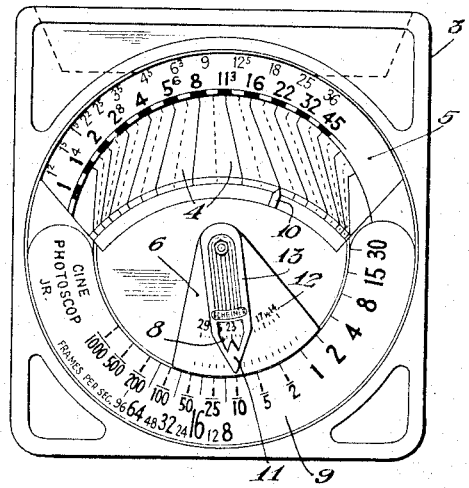

Referring to Figs. 6 and 7, we have shown a practical construction of an exposure meter device according to the invention. The flat photoelectric element 1 and mirror 2 are shown to be mounted at one end of a casing 3 preferably consisting of molded material and also serving for housing the measuring instrument having a pointer seen through an opening in the cover of the casing and shown at 10 (Fig. 7). The photoelectric element 1 and the mirror 2 are fixedly arranged at an angle, in the example shown at an angle of 90° as described hereinbefore.

In order to secure a direct reading of the exposure factors such as the correlated shutter speed or lens aperture or "stop" values for a given speed or sensitivity of photographic film or plate, we have furthermore shown a scale adjusting system comprising a dial 5 arranged underneath the cover of the casing and carrying a scale visible in a cover opening and indicating the lens aperture or "stop" values according to the well known F/system in the example illustrated. The measuring instrument or micro-ammeter may be of any known type and is suitably housed within the casing 3. The dial 5 is rotatably arranged relative to the cover of the casing 3 by means of an adjusting lever shown at 6 fixedly connected to the dial. We have shown a further scale 9 applied to the cover of the casing and indicating in the example shown the shutter speeds or exposure time for a photographic camera.

In order to take into accord different speeds or sensitivity of plate or film, we have provided an index 13 having a pointer 11 displaceably mounted upon the dial 6 as shown. In order to compensate for the non-linear characteristic of the movement of the pointer 10 as a function of the current passed through the measuring instrument. We have further shown guide lines or channels 4 connecting the uneven pointer or instrument graduations with the even graduations of the stop scale 5 such as is shown and described in U. S. Patent 1,864,180 filed August 9, 1929. It is understood that when using a measuring instrument with a linear characteristic, no such guide lines or channels will be required so that the pointer 10 may directly move over the graduations on the dial 5. It is furthermore understood that the "time" scale 9 and the "stop" scale on the dial 5 may be exchanged since both are correlated in a manner well known. The speed of film is shown by a further scale 12 on the dial 6 normally hidden by the index member 13 and visible only through a window 8 in the member 13. In the example shown, the film speeds indicated are in accordance with the well known Scheiner system.

The use of a meter of the type described is as follows: At first the index member 13 is adjusted while holding the dial 6 in fixed position in such a manner that the number for the Scheiner degrees for the particular film or plate used appears in the window 8, thus setting the pointer 11 at a definite position relative to the dial 5. The latter is then rotated by means of the lever 6 until the pointer 11 comes opposite a desired time as shown on the scale 9. The necessary lens aperture may then be read by following the position of the pointer 10 through the adjacent connecting channel 4 to the lens aperture or "F/" scale on the dial 5. Thus, in the example as illustrated, if the speed of film is 23° and the exposure time $\frac{1}{10}$ of a second, the required stop will be F/16.

Referring to Figs. 8 and 9, we have shown a modified construction of an exposure meter according to the invention provided with means for varying the view angle of the meter by a variation of the enclosing angle of the mirror and photoelectric element. This may be accomplished in various manners. In the embodiment illustrated, we have shown the photoelectric element 1 and the mirror 2 hingedly mounted by means of a pair of shafts 20 and 21, respectively, suitably journaled in bearings mounted or molded in the walls of casing 3. The photoelectric element and mirror are held in position by a pair of stop members 15 and 16 through the action of spiral springs 25 and 26, respectively, having one end connected to the shafts 20 and 21 and having the other end fixed upon the casing 3. The stop members 15 and 16 are joined by a connecting element 17 arranged to be moved in a horizontal direction, such as by means of an extension shaft 19 slidably mounted within a slot 19' in the wall of the casing 3. The outer of the shaft 19 carries an adjusting knob 18 having an index cooperating with a scale graduated in effective meter view angles or indicating merely preferred angular positions such as shown at I, II, III in the drawings corresponding, respectively, to normal conditions (50° view angle) to the setting for telephoto work (25°) and for wide angle photography (90°). By gradually varying the angle the meter can be used for enclosing particular subjects at the base of the cone enclosed by the view angle in a manner and for the purpose as described in more detail hereinbefore. The required angle can easily be judged in each case approximately to secure practically satisfactory results. The photoelectric element and reflector are preferably protected against injury as by means of a transparent plate 24 covering the front wall of the casing.

It is furthermore, possible, as will be understood to arrange only one of the elements such as either the photoelectric element or the reflecting mirror in movable manner such as indicated by the diagram in Fig. 10. The latter shows only a single stop member 16 for adjusting the angular position of the mirror 2 while the photoelectric element 1 is mounted at a fixed position.

Fig. 11 illustrates schematically the arrangement of a photoelectric element and mirror at a distance from the front wall of the casing to provide a light chamber 27 acting in combination with the reflector arrangement to secure a directional response characteristic of greater sharpness, as will be understood.

Moreover, it is within the scope of this invention to design the sensitive surface of the photoelectric element in such a manner so as to vary the angle of incidence of the light rays within a definite angular range of spread to secure a directional response characteristic of desired shape as described hereinbefore. Thus, for instance, the photoelectric element 1 in Fig. 10 may be arranged at a definite angle so as to cover the entire space between the upper and lower wall of the casing and at a proper distance from the front wall of the casing, whereby the reflector 2 is omitted entirely. Alternatively, two photoelectric surfaces may be arranged at an angle properly spaced from the front wall of the casing, i. e., in the case of Fig. 11, the mirror 2 would be omitted and replaced by a photoelectric element similar to the element 1 or a single element bent at a definite angle or suitably curved concavely with regard to the direction of the incoming light rays may be provided, as will be understood. In all these various embodiments use is made of the varying photoelectric effect upon a light sensitive surface of the type and nature described herein to modify the resultant directional response characteristic and to secure an effective characteristic of limited spread in accordance with the objects and purposes of this invention as outlined above.

As will be evident from the above description, the invention is not limited to the specific embodiments presented herein for illustration and the underlying principle and inventive concept is susceptible of numerous modifications differing from the specific disclosure herein presented and coming within the broad scope and spirit of the invention as defined in the appended claims.

We claim:

1. An exposure meter comprising a casing, a photoelectric element mounted therein, said photoelectric element having a flat light sensitive surface and being capable of generating an electric current when struck by light rays, a measuring instrument mounted in said casing electrically connected to said photoelectric element, and a mirror mounted in said casing and enclosing a predetermined angle with said light sensitive surface whereby the light to be measured is impinged upon said light sensitive surface both directly and indirectly by reflection from said mirror to secure an effective directional response characteristic for said meter of desired angular spread.

2. An exposure meter as claimed in claim 1, wherein said photoelectric element and mirror are arranged in spaced relation from a light admitting wall of said casing.

3. An exposure meter comprising a casing, a photoelectric element mounted therein, said photoelectric element having a flat light sensitive surface and being capable of generating an electric current when struck by light rays, a measuring instrument mounted in said casing and connected to said photoelectric element, and a mirror adjoining said photoelectric element and enclosing a predetermined angle with its light sensitive surface, said mirror and photoelectric element facing in the direction of the light to be measured so as to receive light simultaneously to secure an effective directional response characteristic for said meter of desired angular spread.

4. An exposure meter comprising a casing, a photoelectric element mounted therein, said photoelectric element having a flat light sensitive surface capable of generating an electric current when struck by light rays, a measuring instrument mounted in said casing and electrically connected to said photoelectric element, and a flat mirror mounted in said casing and enclosing a predetermined angle with said light sensitive surface, said mirror and photoelectric element facing in the direction of the light to be measured so as to receive light simultaneously to secure an effective directional response characteristic for said meter of desired angular spread.

5. An exposure meter comprising a casing, a photoelectric element mounted therein, said photoelectric element having a flat light sensitive surface capable of generating an electric current when struck by light rays, a measuring instrument mounted in said casing and electrically connected to said photoelectric element, and a mirror mounted in said casing and enclosing an angle of 90° with said light sensitive surface, said mirror and photoelectric element facing in the direction of the light to be measured to secure an effective directional response characteristic for said meter of desired angular spread.

6. An exposure meter as claimed in claim 3, comprising means for adjusting the angular position between said mirror and said sensitive surface to secure directional characteristics of different angular spread.

7. A photographic exposure meter comprising a casing, a photoelectric element mounted therein, said photoelectric element having a rectangular light sensitive surface capable of generating an electric current when struck by light rays, a measuring instrument mounted in said casing and electrically connected to said photoelectric element, and a rectangular mirror adjoining said photoelectric element and enclosing a predetermined angle therewith, said mirror and photoelectric element facing in the direction of the light to be measured to secure an effective directional response characteristic for said meter of desired angular spread.

8. An exposure meter as claimed in claim 7, comprising means for varying the angular position of said light sensitive surface and said mirror for securing directional characteristics of different angular spread.

9. A photographic exposure meter comprising a casing, a photoelectric element mounted therein, said photoelectric element having a light sensitive surface capable of generating an electric current when struck by light rays, a measuring instrument mounted in said casing and electrically connected to said photoelectric element, and a mirror adjoining said photoelectric element and enclosing a predetermined angle therewith, said mirror and photoelectric element both facing in the direction of light to be measured to secure an effective directional response characteristic for said meter of desired angular spread, a first dial having a scale indicating exposure values and arranged displaceably relative to said casing, a pointer for said instrument cooperating with said first scale, a second scale on said dial adjacent to said first scale indicating emulsion speed values, a fixed scale on said casing indicating exposure values correlated to said first exposure values and an index member on said dial cooperating with said fixed scale and being adjustable relative to said second scale.

10. An exposure meter as claimed in claim 9 including a separate scale indicating the deflection of said pointer, and guide lines from the graduations of the last mentioned scale to said first scale for correlating nonlinear graduations of the pointer with even graduations on said first scale.

11. An exposure meter as claimed in claim 9, wherein said photoelectric element and said mirror are hingedly mounted, and means for adjusting the enclosing angle therebetween for securing directional characteristics of varying angular spread.

12. An exposure meter as claimed in claim 9, wherein said mirror and said photoelectric element are hingedly mounted, and means for adjusting the enclosed angle in steps to secure directional different characteristics of effective angular spread of 25°, 50° and 90°, approximately.

13. The combination with a light meter comprising a photoelectric element having an extended light sensitive surface, and an electric measuring instrument connected thereto, of means for limiting the light affecting said photoelectric element to rays falling within predetermined angular limits relative to the main measuring direction of said meter, said means comprising a light reflecting element having an extended reflecting surface, said photoelectric element and said light reflecting element being angularly arranged relatively so that both face in the main measuring direction and enclose an angle less than 180° whereby substantially only light falling within said angular limits is impinged upon said light sensitive surface partly directly and partly indirectly from said reflecting element.

14. The combination with a light meter comprising a photoelectric element having an extended light sensitive surface, and an electric measuring instrument connected thereto, of means for limiting the light affecting said photoelectric element to rays falling within predetermined angular limits relative to the main measuring direction of said meter, said means comprising a mirror angularly arranged relatively to said light sensitive surface so that both said light sensitive surface and said mirror face in the main measuring direction and enclose an angle less than 180° and that only light falling within said angular limits is impinged upon said light sensitive surface partly directly and partly indirectly from said mirror.

ERNST REINHOLD.
JOSEPH M. BING.